United States Patent
Huang et al.

(10) Patent No.: US 12,094,184 B2
(45) Date of Patent: Sep. 17, 2024

(54) CONTEXTUAL MATCHING

(71) Applicant: Apple Inc., Cupertino, CA (US)

(72) Inventors: Chen Huang, Cupertino, CA (US); Seyed Hesameddin Najafi Shoushtari, San Francisco, CA (US); Frankie Lu, Campbell, CA (US); Shih-Yu Sun, Cupertino, CA (US); Joshua M. Susskind, San Jose, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 17/410,630

(22) Filed: Aug. 24, 2021

(65) Prior Publication Data
US 2022/0092334 A1 Mar. 24, 2022

Related U.S. Application Data

(60) Provisional application No. 63/081,609, filed on Sep. 22, 2020.

(51) Int. Cl.
*G06V 10/75* (2022.01)
*G06V 10/34* (2022.01)
*G06V 10/40* (2022.01)

(52) U.S. Cl.
CPC ............ *G06V 10/751* (2022.01); *G06V 10/34* (2022.01); *G06V 10/40* (2022.01)

(58) Field of Classification Search
CPC ...... G06V 10/751; G06V 10/34; G06V 10/40; G06V 10/23; G06V 10/426; G06V 10/46
See application file for complete search history.

(56) References Cited

U.S. PATENT DOCUMENTS

| | | | |
|---|---|---|---|
| 8,422,793 B2 | 4/2013 | Iwamura | |
| 9,002,099 B2* | 4/2015 | Litvak | G06V 10/462 382/209 |
| 9,235,904 B1 | 1/2016 | Wang | |
| 2015/0016723 A1* | 1/2015 | Francini | G06V 10/757 382/170 |
| 2016/0292867 A1* | 10/2016 | Martini | G06T 7/55 |
| 2017/0249752 A1* | 8/2017 | Kotake | G06T 7/73 |
| 2018/0253861 A1* | 9/2018 | Moteki | G06T 7/174 |

(Continued)

FOREIGN PATENT DOCUMENTS

| | | | | |
|---|---|---|---|---|
| WO | 2014092193 A1 | 6/2014 | | |
| WO | WO-2019091787 A1 * | 5/2019 | ............. | G06N 3/082 |

OTHER PUBLICATIONS

Ma et al, Improved ORB Algorithm Using Three-Patch Method and Local Gray Difference, 2020, Sensors (20) 975: 1-26. (Year: 2020).*

(Continued)

*Primary Examiner* — Aaron W Carter
*Assistant Examiner* — Kathleen M Broughton
(74) *Attorney, Agent, or Firm* — Blank Rome LLP

(57) ABSTRACT

Feature descriptor matching is reformulated into a graph-matching problem. Keypoints from a query image and a reference image are initially matched and filtered based on the match. For a given keypoint, a feature graph is constructed based on neighboring keypoints surrounding the given keypoint. The feature graph is compared to a corresponding feature graph of a reference image for the matched keypoint. Relocalization data is obtained based on the comparison.

20 Claims, 7 Drawing Sheets

(56) References Cited

U.S. PATENT DOCUMENTS

2018/0268256 A1* 9/2018 Di Febbo ............ G06V 10/757
2019/0156145 A1* 5/2019 Pourian ................. G06F 18/22
2019/0388182 A1* 12/2019 Kumar ................ G06V 10/757

OTHER PUBLICATIONS

Ye et al, DNF: Feature Point Matching Pairs Filter Based on Descriptor Net, 2019, Digital Object Identifier (7): 87561-87573. (Year: 2019).*

Bowen et al, A novel graph-based invariant region descriptor for image matching, 2012, IEEE International Conference on Electro/Information Technology, pp. 1-6. (Year: 2012).*

Zhang et al, A depth-incorporated 2D descriptor for robust and efficient 3D environment reconstruction, 2015, 10th International Conference on Computer Science & Education, pp. 1-6. (Year: 2015).*

* cited by examiner

CONTEXTUAL MATCHING

BACKGROUND

Computer vision often relies upon identification of keypoints in an image, from which feature descriptors can be determined to obtain information in a scene. Typically, feature descriptors may be determined using a descriptor network which has been trained to identify feature descriptors from reference images. For example, images may be captured of a scene during different times or while the scene has different characteristics. Those images may then be utilized to identify keypoints, which may be utilized for detection, image retrieval, localization, and the like.

Searching for good feature correspondences is a fundamental step for tasks such as visual relocalization. However, mismatches are often inevitable since local features can suffer from visual ambiguity. What is needed is an improved technique for matching features across images.

DETAILED DESCRIPTION

Figure 1A:
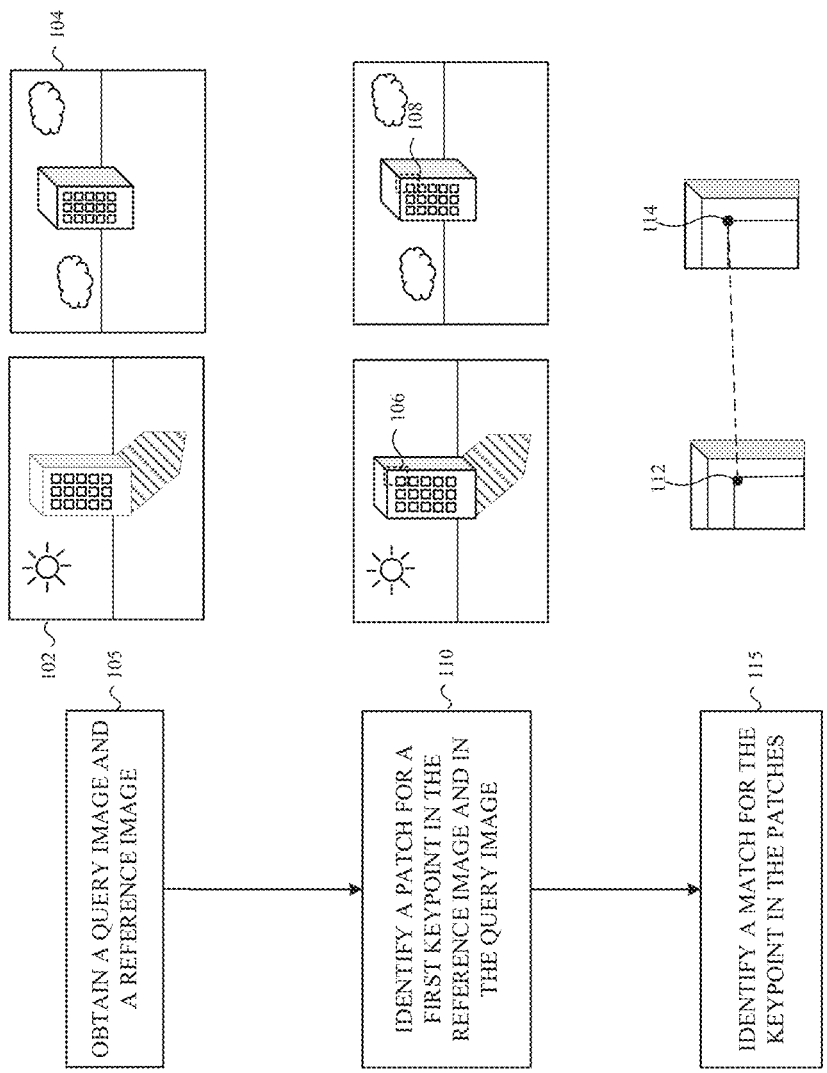
FIGS. 1A-1B show, in flow diagram form, a technique for keypoint matching, according to one or more embodiments.

This disclosure pertains to systems, methods, and computer-readable media to identify keypoint matches based on context information. Generally, a keypoint descriptor is determined for a keypoint. The keypoint descriptor may describe visual descriptors and/or deep learning descriptors. In some embodiments described herein, keypoint descriptors may be obtained by applying a trained network to image data for a keypoint. The trained network may be trained to produce a binarized feature descriptor. The binarized feature descriptor may be used to identify keypoint matches in reference images.

In some embodiments, constraints may be applied to the feature-matching process in order to resolve matching uncertainties. In some embodiments, a distance ratio test may be applied which imposes a margin between the nearest neighbor and remaining neighbors. Further, the matches may be further refined by removing unmatched feature points or feature points with more than one match. For each remaining keypoint node, a graph may be generated that includes a spatial representation of the keypoints and its spatial neighbors. The graph may be compared to a corresponding graph for a corresponding subject keypoint in each reference image to determine a graph distance for a particular reference image. The graph distance may be based on visual and/or geometric comparisons of the graphs. In some embodiments, keypoints may be filtered out or weighted down based on inconsistent neighborhoods based on the graph distance.

In some embodiments, using contextual matching in a filtering stage of a relocalization technique may filter out feature matches with inconsistent neighborhoods. For a single feature pair with low matching confidence, if there are consistent neighboring matches around each feature, the feature matching score should be boosted due to the highly similar neighborhoods. On the other hand, a similar feature pair that lacks reliable matches from their contexts is more likely to be a false positive and should be assigned a low graph-matching score.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints) and that these goals may vary from one implementation to another. It will also be appreciated that such development efforts might be complex and time consuming but would nevertheless be a routine undertaking for those of ordinary skill in the design and implementation of graphics modeling systems having the benefit of this disclosure.

Figure 1B:
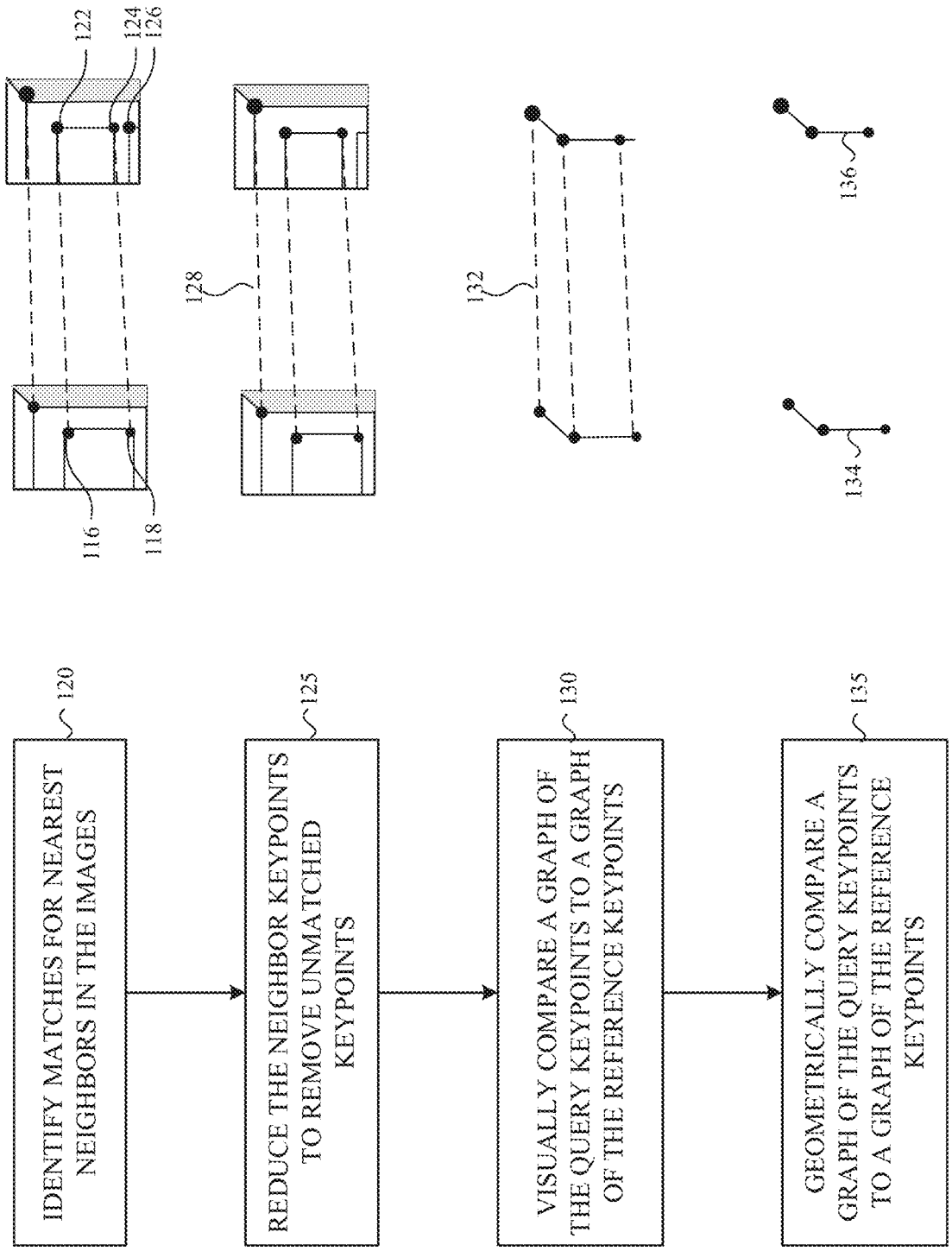

FIGS. 1A-1B show, in flow diagram form, a technique for contextual keypoint matching according to one or more embodiments. Contextual keypoint matching may be utilized, for example, for relocalization techniques, image matching, camera pose determination, and the like. The flow diagram begins with FIG. 1A at 105 where a system obtains a query image 102 and a reference image 104. The query image 102 may be an image captured from a camera at a device for which localization information is requested, for example. In some embodiments, the query image 102 may be associated with depth information or other sensor information which may be utilized to determine localization information. Reference image 104 may be obtained from a local store of reference images or from network storage that includes reference images. In some embodiments, the reference image 104 may be associated with the same user profile as that of the query image 102. The reference image 104 may include an image of the same or similar physical environment as that captured by the query image 102. Although a single reference image 104 is shown, it should be understood that multiple reference images may be utilized for determining localization information or otherwise during the process of contextual matching. In some embodiments, the steps described within FIGS. 1A-1B may be repeated for each of multiple reference images.

The flowchart continues at block 110, where the system identifies a patch for a first keypoint in the reference image 104 and in the query image 102. In some embodiments, a keypoint may be a feature point in the query image 102, which may be used to compare the scene depicted in the query image 102 with the reference image 104. Accordingly, a corresponding keypoint may be identified in the reference image 104. Each keypoint may be associated with a patch that includes image data surrounding the keypoint from which a description of the keypoint can be generated. As such, the query image 102 may include patch 106, whereas the reference image 104 may include a keypoint area from which a corresponding reference descriptor may be determined. The flowchart continues at block 115, where the system identifies a match for the keypoint. Accordingly, as depicted, keypoint 112 of the query image 102 is compared against keypoint 114 of the reference image 104. In some embodiments, a feature descriptor of the query image keypoint and a feature descriptor of the reference image keypoint are compared to determine a feature distance. In some embodiments, a feature vector may be obtained for the subject keypoint and the reference keypoint, and a vector distance may be determined from the two feature vectors.

Continuing to FIG. 1B, the flowchart continues at block 120, where the system identifies matches for nearest neighbor keypoints 116 and 118 within the query image and corresponding reference keypoints 122, 124, and 126 in the reference image. In some embodiments, the nearest neighbors are selected by identifying feature points that are spatially closest to the subject keypoint in the image. In some embodiments, a predetermined number of feature points nearest the subject feature point may be selected. Additionally, or alternatively, a portion of the image surrounding the subject keypoint may be used to identify spatially close neighbor keypoints.

The flowchart continues at block 125, where the system reduces the neighbor keypoints to remove unmatched keypoints to obtain a reduced set of matched keypoints 128. In some embodiments, only neighbor keypoints with a one to one match in the reference image may be considered. In some embodiments, a distance ratio test may be additionally or alternatively applied to the keypoints, which imposes a margin between the nearest neighbor and remaining neighbors with respect to feature similarity to reduce the features considered to those most likely to result in strong matches. While the reduction of keypoints is described here as occurring after selection of the neighbor nodes, in some embodiments, the reduction of keypoints may be performed globally across an image, or a portion of the image, earlier in the contextual matching process.

At block 130, a visual comparison is performed on a graph of the query keypoints to a graph of the reference keypoints. The graph of the query keypoints may be generated from a subject keypoint 112 and the neighbor keypoints selected at 120 and remaining after the reduction of keypoints 128. The graph from the reference keypoints may be generated based on the matching keypoints to those in the query keypoint graph. The visual comparison 132 may involve determining a similarity between the visual characteristics of the query graph and the reference graph. The visual comparison may include, for example, comparing the overall shape of the collection of nodes making up the graph.

The flowchart concludes at block 135, where the query graph 134 and the reference graph 136 are compared for geometric similarity, according to some embodiments. Comparing the query graph and the reference graph for geometric similarity may include, for example, analyzing edge nodes of each of the graphs to determine how similar the edge configuration is across the graphs. In some embodiments, it may be assumed that a relative ordering of features should be consistent across differing viewpoints. According to some embodiments, the result of the visual and/or geometric comparison of the graphs may be used as a weighting parameter for determining inliers and outliers. As such, a feature point with a strong contextual comparison may be weighted more heavily as a match than a feature point with a weak contextual comparison.

Figure 2:
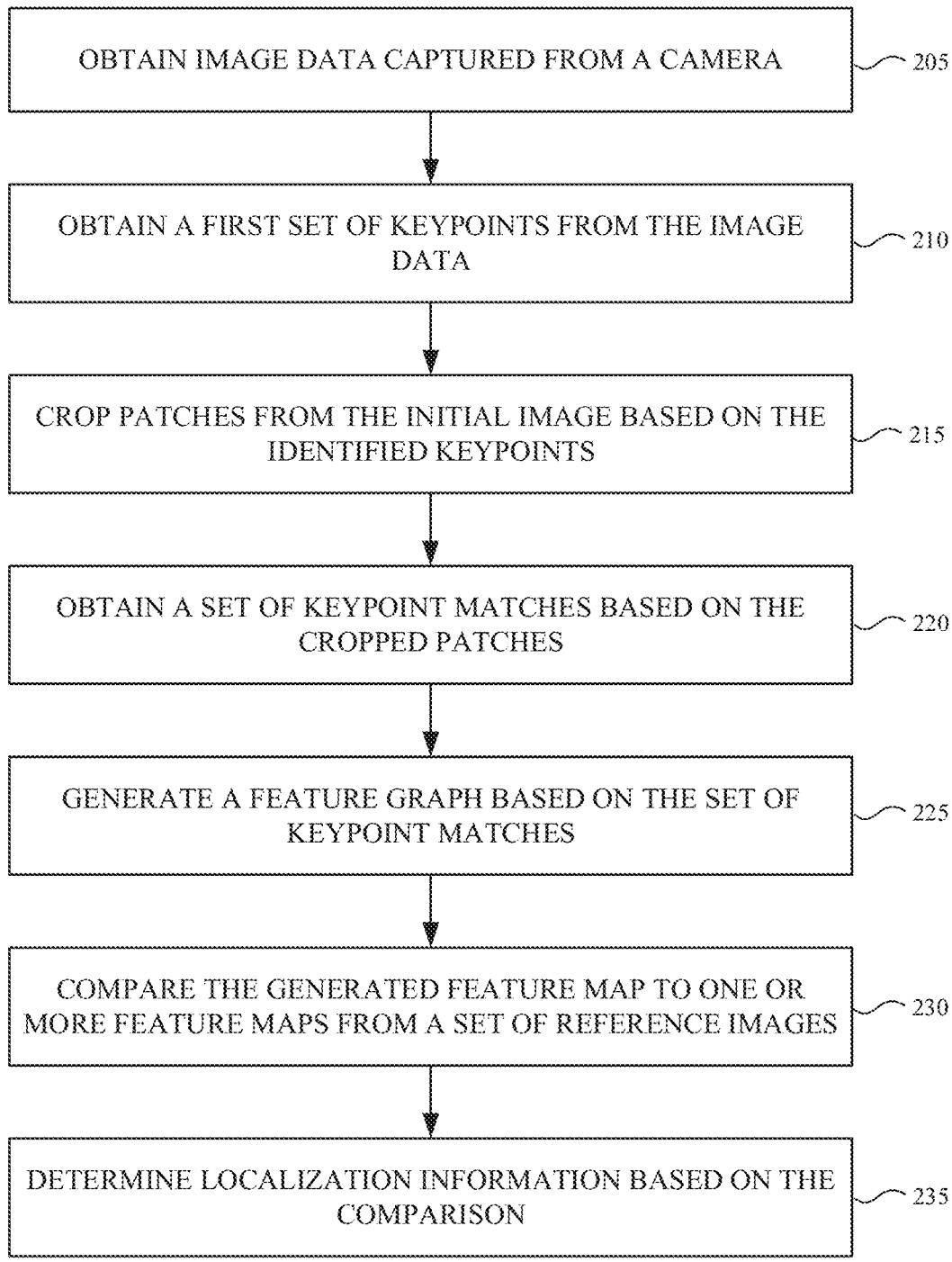
FIG. 2 shows a flowchart of a technique for keypoint matching, according to one or more embodiments.

FIG. 2 shows a flowchart of a technique for keypoint matching, according to one or more embodiments. Although the various processes depicted in FIG. 2 are illustrated in a particular order, it should be understood that the various processes may be performed in a different order. Further, not all the processes may be necessary to be performed to train the descriptor network.

The flowchart begins at 205, where the system obtains image data captured from a camera. The image data may be captured by a camera for which localization information is to be determined, such as camera pose information, location information, and the like. The image data may include, for example, color images, black and white images, and the like. Further, in some embodiments, the image data may include depth information or other sensor information for which the system may determine localization information.

The flowchart continues at block 210, where a descriptor module determines the keypoint using the query image data from step 205. In one or more embodiments, a detector is applied to the image to identify the keypoints. The detector may be a feature detector, such as SIFT or SURF, which identifies features, or points of interest (i.e., keypoints) in an image.

The flowchart continues at block 215, where the patches are cropped. In one or more embodiment, the patches may be cropped from the image data captured at 205 based on the keypoints detected at 210. The patch for a subject keypoint may include image data surrounding the keypoint from which descriptor information may be determined.

At block 220, a set of keypoint matches are obtained based on the cropped patches. In some embodiments, the keypoint matches will be determined using a triple loss function. The keypoint matches may be determined by comparing binarized descriptors for the keypoints to identify matching keypoints between a query image and one or more reference images. In some embodiments, the keypoint matches may be determined using FREAK, SIFT, or the like. Keypoint matching may be optimized by utilizing binarized descriptors in the matching process to reduce necessary computation resources, according to some embodiments. By using a triple loss function, matched keypoints are only utilized if the match is strong enough to distinguish effectively from other candidate keypoints, as will be described below with respect to FIG. 3.

The flowchart continues at block 225, where feature graph is generated base on the set of keypoint matches. The feature graph may be generated by identifying one or more neighboring keypoints to a particular keypoint to determine a geometric graph. In some embodiments, the feature graph may be generated by identifying a spatial relationship between a subject keypoint and constrained neighbor keypoints. That is, only keypoints with a one-to-one match may be considered in generating the feature graph.

At block 230, the system will compare the generated feature graph to feature graphs for corresponding feature points from reference images. In some embodiments, spatial characteristics of the graph from the query image and the graph from the reference image may be considered in the case of visual matching. Additionally, or alternatively, edge similarity may be considered in the case of geometric matching. For example, the relative location of the neighbor keypoints may be compared in the query image and the reference images.

The flowchart concludes at block 235 where the system determines a camera pose or other localization information based on the comparison. According to one or more embodiments, the localization data may provide descriptor data or other localization data based on identified keypoints from the query image and the reference image.

Figure 3:
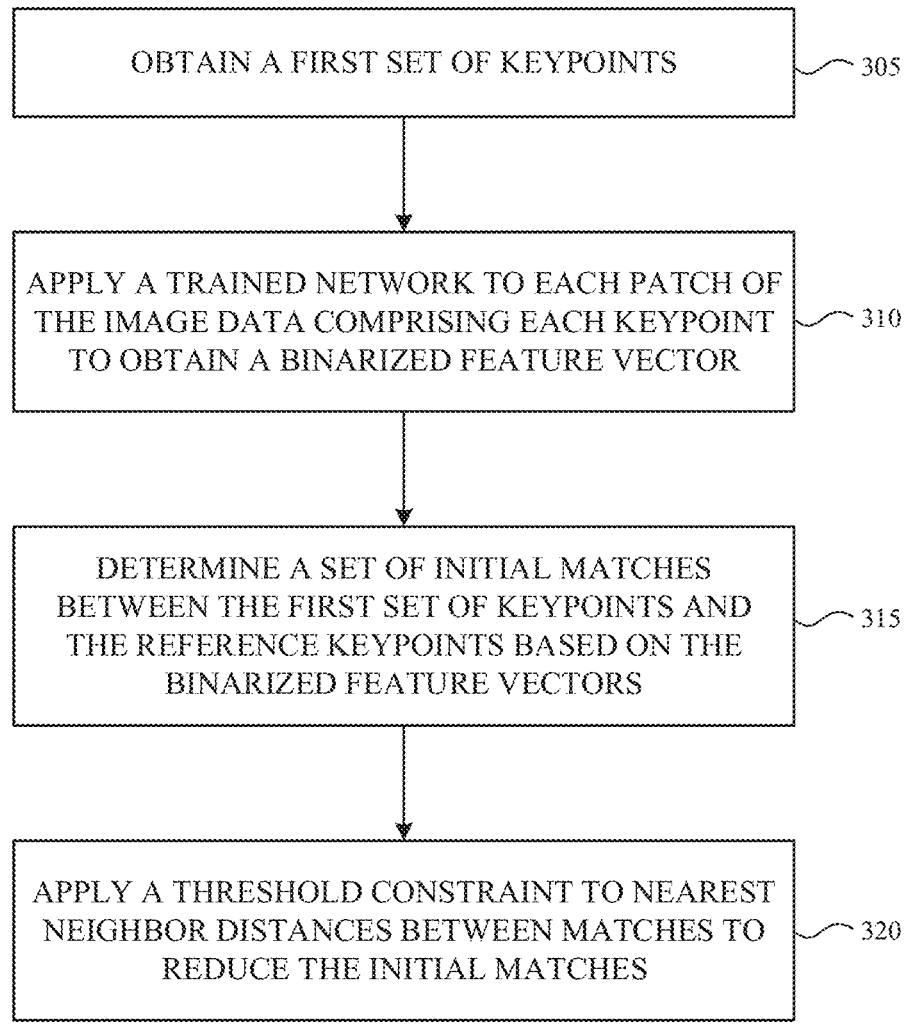
FIG. 3 shows a flowchart of a technique for refining an initial set of keypoint matches, according to one or more embodiments.

FIG. 3 shows a flowchart of a technique for refining an initial set of keypoint matches, according to one or more embodiments. Although the various processes depicted in FIG. 3 are illustrated in a particular order, it should be understood that the various processes may be performed in a different order. Further, not all the processes may be necessary to be performed to train the descriptor network.

The flowchart begins at block 305 where the system obtains a first set of keypoints. The keypoints may be obtained as described above with respect to block 210 of FIG. 2. The keypoints may be determined by using a feature detector which identifies keypoints, or feature points, in an image. Examples of feature detectors may include a Difference of Gaussian ("DoG") detector or other scale-invariant keypoint detector.

At block 310, a trained network is applied to each patch of the image that includes a keypoint to obtain a binarized feature vector. That is, a neural network may be trained with patches from training images to generate a binarized descriptor. Accordingly, a binarized feature descriptor is obtained for each of the keypoints in the image. Alternatively, a feature vector may be obtained by other means, or may be generated in a nonbinarized format.

The flowchart continues at block 315 where a set of initial matches is determined between the first set of keypoints from the query image and keypoints in one or more reference images. The initial set of matches may be determined, for example, using a nearest neighbor search to compare a binarized feature vector for a keypoint from a query image to a binarized feature vector of a reference image. Alternatively, other methods may be used to determine keypoint matches from feature vectors.

The flowchart concludes at block 320, where a threshold constraint is applied to the nearest neighbor distances between matches to reduce the initial matches to revised list. In some embodiments, the threshold constraint may be applied globally to feature points across an image or to feature points within a portion of an image surrounding a given keypoint, such as a patch, or portion of the image from which a feature graph is to be identified. The threshold constraint may include a distance ratio test that enforces a threshold between the nearest neighbor distance and a second nearest neighbor distance for purposes of determining similarity among feature points. As such, the remaining keypoints utilized for localization are those determined to be most likely to yield useful results because they are a substantially closer match as compared to the next closest candidate keypoint. In some embodiments, the initial matches may be further reduced to remove unmatched feature points or feature points with more than one match. Said another way, in some embodiments, only feature points that are associated with a one-to-one match for a particular reference image may be used for localization purposes.

Figure 4:
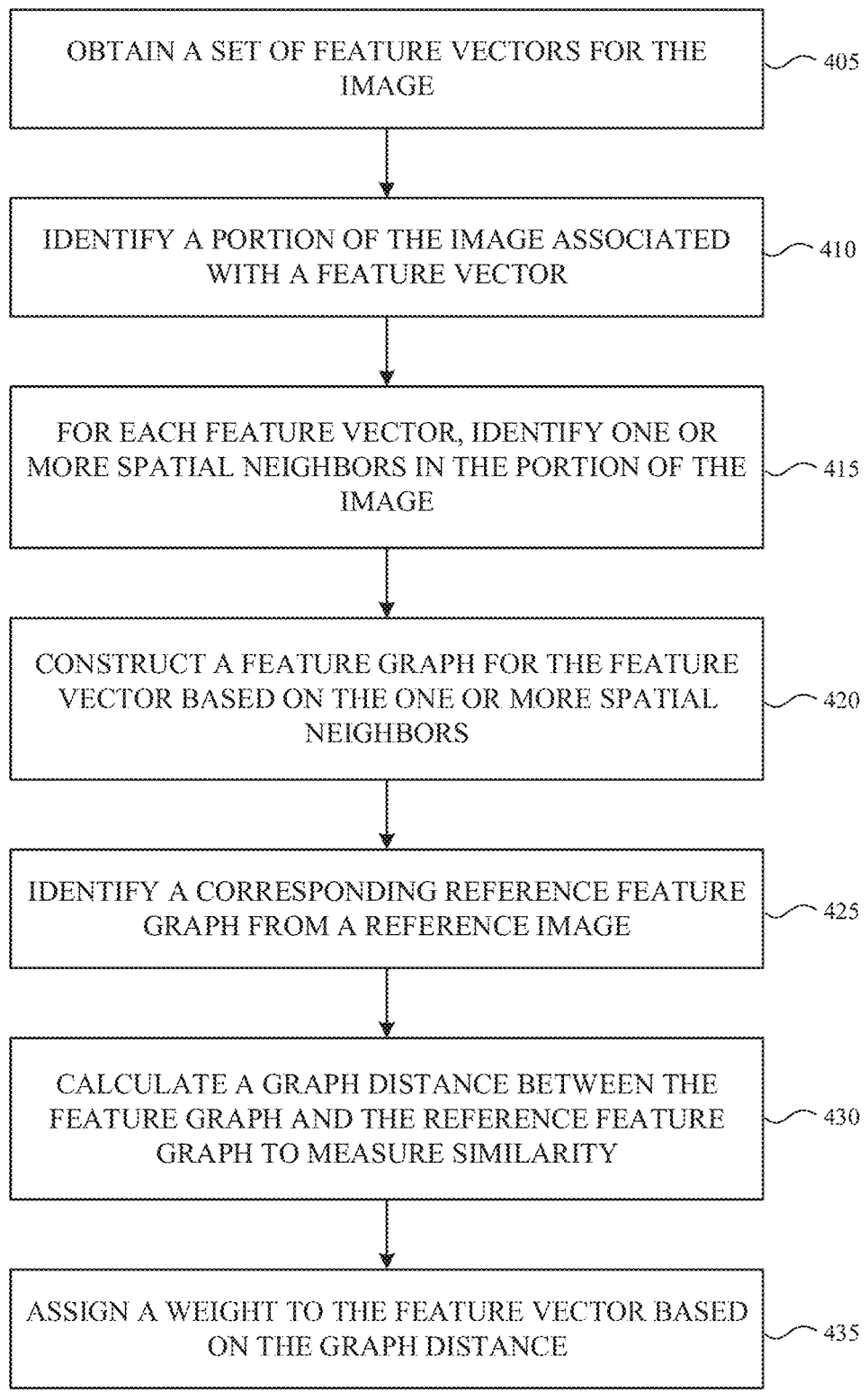
FIG. 4 shows a flowchart illustrating a technique for comparing context for keypoint matching, in accordance with one or more additional embodiments.

FIG. 4 shows a flowchart illustrating a technique for comparing context for keypoint matching, in accordance with one or more additional embodiments. Although the various processes depicted in FIG. 4 are illustrated in a particular order, it should be understood that the various processes may be performed in a different order. Further, not all the processes may be necessary to be performed to train the descriptor network.

The flowchart begins at block 405, where a set of feature vectors are obtained for the image. As described above, a feature vector may be obtained for a given keypoint. In some embodiments, a portion of the image data that includes the feature (i.e., a patch) may be provided as input to a trained neural network which provides a feature descriptor for the keypoint based on the provided image data. According to some embodiments, the neural network may be trained to provide a binarized feature vector as a descriptor for a keypoint or nonbinarized feature vector.

The flowchart continues at block 410 where, in some embodiments, the system identifies a portion of the image associated with a feature vector. The portion of the image may include the image patch, for example. In some embodiments, the size of the image portion may be a predetermined size or user-selectable size. In some embodiments, the size of the image portion may be dynamically determined to encapsulate a predetermined number of feature points such that a feature graph may be generated.

At block 415, one or more spatial neighbors are identified in the portion of the image. According to one or more embodiments, spatial neighbors are identified in the query image based on a spatial proximity to the subject feature point. In some embodiments, the features may be selected from the reduced feature set as described in FIG. 3. The spatial neighbors may include, for example, all spatial neighbors within a predetermined distance, a predetermined number of closest neighbors to the feature point, and the like. According to some embodiments, the larger the spatial coverage used, the larger and more statistically meaningful the feature graph may be. However, the larger the feature graph, the more expensive the match becomes to perform. As such, the size of the graph and/or the area used for generating the graph may be modified based on whether resource expense and/or accuracy should be prioritized either automatically or via user input. At block 420, a feature graph is constructed for the feature vector based on the one or more spatial neighbors. In some embodiments, the feature graph may be a geometric relationship between the subject keypoint and the spatial neighbors.

The flowchart continues at 425, where a corresponding reference feature graph is obtained from a reference image. In some embodiments, the reference graph may be generated by finding the matching reference keypoint as described in FIG. 3 as well as the matching reference feature points for each of the spatial neighbors obtained at 415 in the query image. The reference feature graph may indicate a geometric relationship between the corresponding matches for the query keypoint and query spatial neighbors. In some embodiments, the matching reference keypoints may be located using a lookup table associated with the reference image comprising the reference keypoints.

At block 430, a graph distance is calculated between the feature graph and the reference feature graph to measure similarity. Graph distance may be determined in a number of ways. In some embodiments, the graph distance may be determined based on a match of the two feature graphs. An example formula for determining graph distance $D(G_i, G_j)$ where $G_i = (V_i, E_i)$ refers to a query feature graph and $G_j$ refers to a reference feature graph. For $F_i$'s reference match $f_j$ extracted at location j in the reference image, feature graph $G_j$ is constructed. Nodes $V_i$ include a subject feature vector $f_i$ for a subject keypoint and its spatial neighbors $\{f_{m|m \neq i}\}$. In some embodiments, $\{f_m\}$ may be retrieved by indexing a look-up table that stores the feature matches and their locations. Edges $E_i$ are defined following a self-similarity method. In some embodiments, the Hamming distance $\{d_{i,m}\}$ is calculated between $f_i$ and its neighbors $\{f_m\}$.

The flowchart concludes at block 435 where a weight is assigned to the feature vector based on the graph distance. The two feature graphs can be matched based on graph distance as follows:

$$D(G_i, G_j) = d_{i,j} \times h(\hat{d}) + \alpha \frac{1}{\sum_{m \in V_i, n \in V_j} w_{m,n}} \sum_{m \in V_i, n \in V_j} d_{m,n} \times w_{m,n}$$

In some embodiments, the graph distance is a reweighted combination of the intergraph distances between all the nodes, such as $d_{i,j}$ and $\{d_{m,n}\}$. The weight $h(\hat{d})$ for $d_{i,j}$ may be based on the relative ranking $d_{i,j}$ among all the intragraph distances $\{d_{i,m}\}$. In addition, $$\hat{d} = d_{i,j} / \left( \min_{m \in V_i} d_{i,m} + \epsilon \right)$$

may approximate such a ranking and normalize it via an increasing function $h(\hat{d}) \in [0,1]$. In some embodiments, the smaller $\hat{d}$ is, the more $d_{i,j}$ should be tuned down to encourage graph similarity. In some embodiments, $w_{m,n}$ may indicate edge similarity, which may be used to reweight the intergraph node distance $d_{m,n}$. Further, $\alpha$ may be an additional weighting parameter based on the two distance terms. A pre-defined a value may be used or may be determined based on how the two terms should contribute.

In some embodiments, the graph-matching process may be end-to-end learnable, such as through a deep-learning algorithm, but the above-described technique may be an efficient rematching and filtering mechanism that may be utilized with current feature matching techniques, such as SLAM.

In some embodiments, the graph-matching technique may be improved by additionally considering geometric context. That is, the above description with respect to blocks 430-435 describe a technique for comparing visual context of feature graphs across a query image and a reference image. In addition, in some embodiments, geometric contexts may be utilized. It may be assumed that the angular order of edges in a graph may be preserved across viewpoints. As such, the geometric context may be determined to consider geometric similarity. An example of determining the geometric similarity may be an additional term $\lambda d_{kendall}(\tau_i, \tau_j)$ where $\tau_i$ denotes the angular rankings of the nodes $V_i$ in graph $G_i$, and $d_{kendall} \in [0,1]$ is the normalized Kendall tau distance that measures the disagreement between two ranking lists, and $\lambda = 100$ is a weighting parameter. Thus, in some embodiments, a unified graph-matching distance may be defined as:

$$D(G_i, G_j) = d_{i,j} \times h(\hat{d}) + \alpha \frac{1}{\sum_{m \in V_i, n \in V_j} w_{m,n}} \sum_{m \in V_i, n \in V_j} d_{m,n} \times w_{m,n} + \lambda d_{kendall}(\tau_i, \tau_j)$$

The graph distance can be used to effectively filter out the initial matches with low confidence. Such a graph-matching method provides a fast filtering mechanism, which may be followed by standard RANSAC in a SLAM relocalization pipeline.

Figure 5:
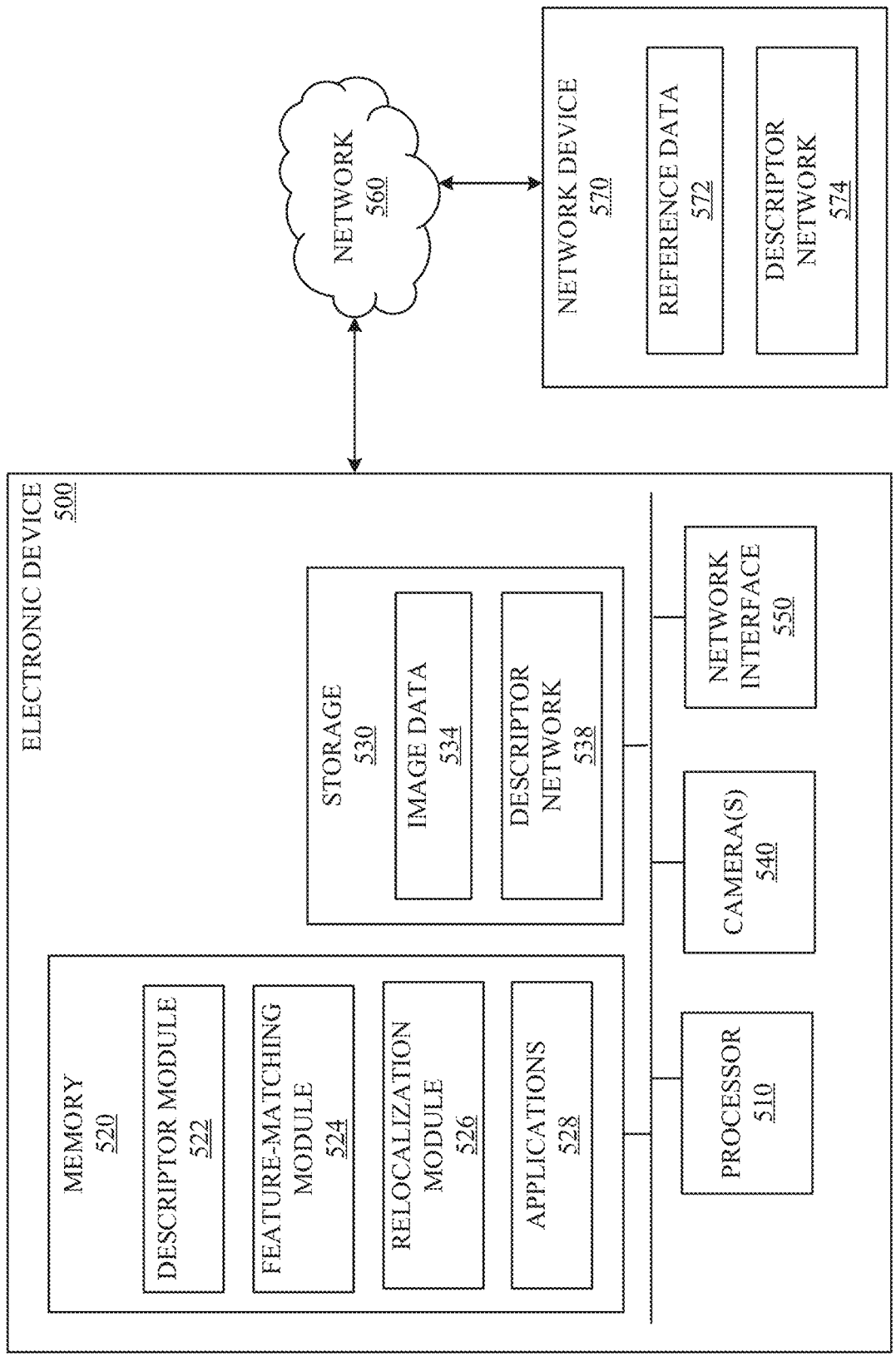
FIG. 5 shows, in block diagram form, a simplified system diagram for keypoint matching, according to one or more embodiments.

Referring to FIG. 5, a simplified block diagram of an electronic device 500 is depicted, in accordance with one or more embodiments. Electronic device 500 may be part of a multifunctional device. Further, according to one or more embodiments, the various components presented in electronic device 500 may be distributed across one or more connected electronic devices. Electronic device 500 may additionally be connected to one or more other network devices 570 via network interface 550 within which the various functionality may be contained, or across which the various functionality may be distributed across network 560. Illustrative networks include, but are not limited to, a local network such as a universal serial bus (USB) network, an organization's local area network, and a wide area network such as the Internet. According to one or more embodiments, electronic device 500 is utilized to perform feature matching techniques, for example, for relocalization.

Electronic device 500 may include processor 510, such as a central processing unit (CPU). Processor 510 may be a system-on-chip such as those found in mobile devices and include one or more dedicated graphics processing units (GPUs). Further, processor 510 may include multiple processors of the same or different type. Electronic device 500 may also include a memory 520. Memory 520 may include one or more different types of memory, which may be used for performing device functions in conjunction with processor 510. For example, memory 520 may include cache, ROM, RAM, or any kind of transitory or non-transitory computer-readable storage medium capable of storing computer-readable code. Memory 520 may store various programming modules for execution by processor 510, including descriptor module 522, feature matching module 524, relocalization module 526, and other applications 528. Electronic device 500 may also include storage 530. Storage 530 may include one more non-transitory computer-readable mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM).

Electronic device 500 may also include one or more camera(s) 540 or other sensors. In one or more embodiments, at least one of the one or more cameras may be a traditional RGB camera. Further, cameras may include a stereo camera or other multicamera system, a time-of-flight camera system, or the like. Camera 540 may include a lens assembly, a sensor, and other circuitry which may be utilized together to capture RGB images.

Electronic device 500 may allow a user to interact with extended reality (XR) environments. There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 530 may be utilized to store various data and structures which may be utilized for providing a technique for providing localization information for an image. Storage 530 may include, for example, image data 534 and descriptor network 538. Image data 534 may include, for example, images that are captured by camera 540. Image data 534 may include visual data as well as depth data for images.

In addition to the training data, storage 530 may also include descriptor network 538. The descriptor network 538 may be a network that is trained to provide descriptors for a provided image, for example, in the form of a descriptor vector. In one or more embodiments, the descriptor network may be trained on patches of image data that relate to keypoints in training images. In some embodiments, the descriptor network may be trained to provide a binarized descriptor for provided image data. Although the various components described within storage 530 are depicted as within a single storage, it should be understood that the various components or data within the components may be distributed across multiple storage devices or even across multiple electronic devices, for example, across a network.

According to one or more embodiments, memory 520 may include one or more modules that comprise computer-readable code executable by the processor(s) 510 to perform functions. The memory may include, for example, descriptor module 522 which may be used to obtain a keypoint descriptor for an image, for example, from image data 534. In some embodiments, the descriptor module 522 may take a portion of an image, such as a patch of a given image, that includes a particular keypoint. The descriptor module 522 may apply a descriptor network 538 to the image or the portion of the image to obtain a keypoint descriptor which indicates a description of the particular keypoint. The keypoint descriptor may be a binarized descriptor in the form of a compact binary string.

The memory 520 may also include feature-matching module 524 which may utilize the keypoint descriptors to match keypoints with reference images, such as from reference data 572 of network device 570. According to one or more embodiments, the feature-matching module 524 may utilize the keypoint descriptors generated by descriptor module 522 to identify keypoint matches, for example, in reference data 572. The feature-matching module 524 may then provide the matching data to relocalization module 526 to be used for relocalization processes.

According to one or more embodiments, relocalization module 526 may utilize the feature descriptors to determine localization information for a current image. For example, a camera pose may be determined based on the matching data by comparing a keypoint descriptors from a current image as compared to reference images, for example, from reference data 572.

Although electronic device 500 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be differently directed based on the differently distributed functionality. Further, additional components may be used, and some combination of the functionality of any of the components may be combined.

Figure 6:
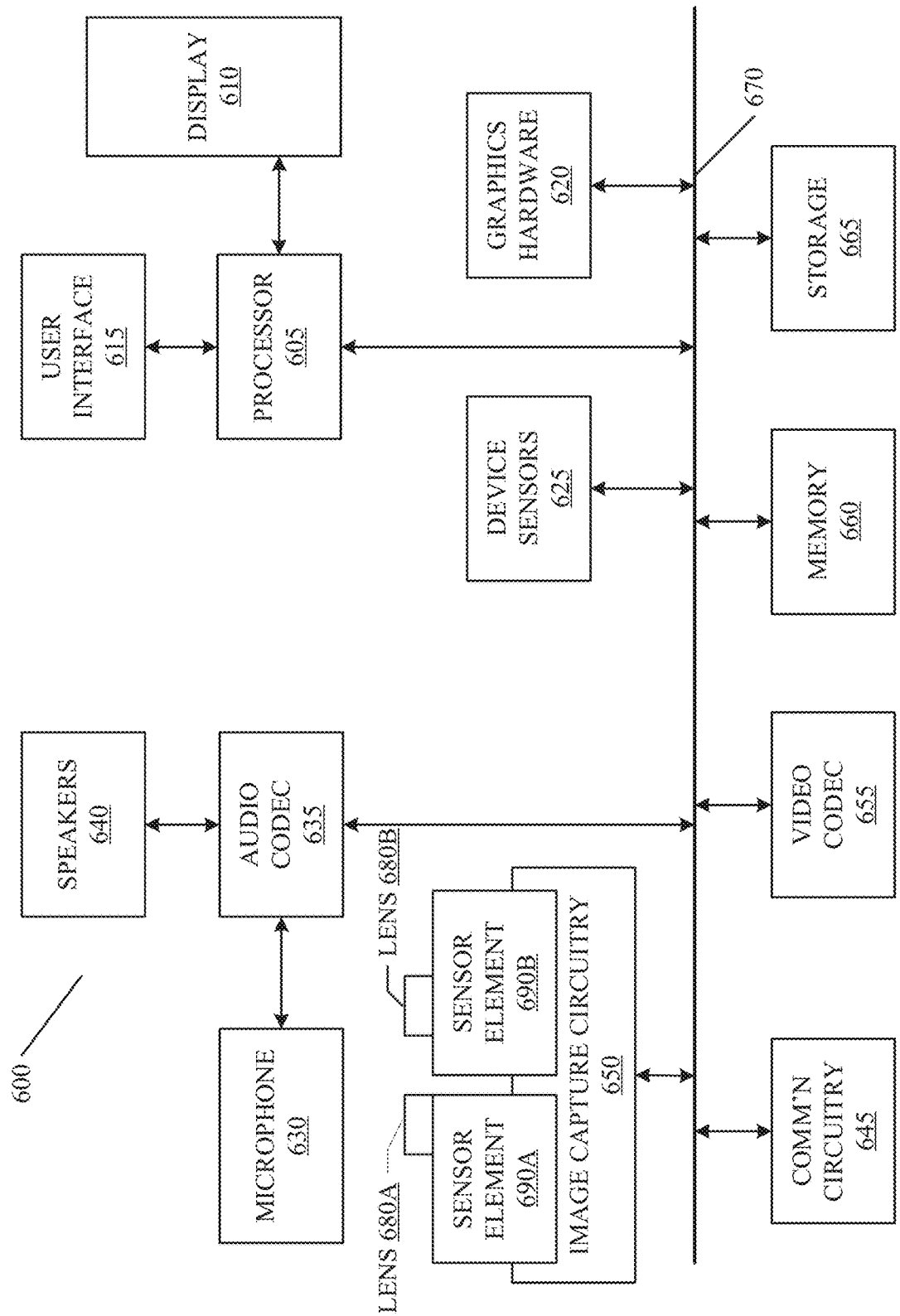
FIG. 6 shows, in block diagram form, a computer system, in accordance with one or more embodiments.

Referring now to FIG. 6, a simplified functional block diagram of illustrative multifunction electronic device 600 is shown according to one embodiment. Each electronic device may be a multifunctional electronic device or may have some or all of the described components of a multifunctional electronic device described herein. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system), video codec(s) 655 (e.g., in support of digital image capture unit), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images as disclosed herein). Processor 605 may, for instance, drive display 610 and receive user input from user interface 615. User interface 615 may allow a user to interact with device 600. For example, user interface 615 can take a variety of forms, such as a button, keypad, dial, click wheel, keyboard, display screen and/or touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 650. Images so captured may be stored in memory 660 and/or storage 665.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer-readable storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605, such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 1-4 or the arrangement of elements shown in FIGS. 1 and 5-6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

The invention claimed is:

1. A method for relocalization, comprising:
    obtaining, for a query image, a first set of keypoints;
    determining a set of initial matches between the first set of keypoints and a set of reference keypoints in a reference image to obtain a first set of matched keypoints from the first set of keypoints and a second set of matched keypoints from the set of reference keypoints;
    constructing a feature graph comprising a geometric spatial relationship between a first keypoint of the first set of matched keypoints and a second one or more keypoints of the first set of matched keypoints, wherein the second one or more keypoints correspond to spatial neighbors to the first keypoint;
    identifying, from the reference image, a first reference keypoint from the second set of matched keypoints, wherein the first reference keypoint is matched to the first keypoint of the first set of matched keypoints;
    identifying, from the reference image, a first reference keypoint from the second set of matched keypoints based on the first reference keypoint matching the first keypoint of the first set of matched keypoints;
    comparing a geometry of the feature graph to a geometry of the reference feature graph; and
    determining relocalization data for the query image based on the comparison.

2. The method of claim 1, wherein determining the set of initial matches further comprises removing keypoints from the first set of keypoints that are not matched with the set of reference keypoints.

3. The method of claim 1, further comprising filtering the set of initial matches by applying threshold constraint between a nearest neighbor distance and a next nearest neighbor distance among the set of initial matches.

4. The method of claim 1, wherein obtaining the first set of keypoints comprises:
    obtaining, for each of the first set of keypoints, a first feature vector, wherein the set of initial matches is determined by comparing the first feature vector to one or more feature vectors for the set of reference keypoints.

5. The method of claim 4, wherein the first feature vector is obtained from a neural network trained to generate a first binarized feature vector based on input image data.

6. The method of claim 1, wherein the feature graph comprises a spatial representation of a plurality of the first set of keypoints in at least a portion of the query image.

7. The method of claim 6, wherein the reference feature graph comprises a spatial representation of keypoints for a corresponding feature vector.

8. The method of claim 1, wherein the first set of keypoints are obtained from a first portion of the query image, and wherein the set of initial matches are determined from corresponding portions of the reference image.

9. A non-transitory computer-readable medium comprising computer-readable code executable by one or more processors to:
    obtain, for a query image, a first set of keypoints;
    determine a set of initial matches between the first set of keypoints and a set of reference keypoints in a reference image to obtain a first set of matched keypoints from the first set of keypoints and a second set of matched keypoints from the set of reference keypoints;
    construct a feature graph comprising a geometric spatial relationship between a first keypoint of the first set of matched keypoints and a second one or more keypoints of the first set of matched keypoints, wherein the second one or more keypoints correspond to spatial neighbors to the first keypoint;
    identify, from the reference image, a first reference keypoint from the second set of matched keypoints, wherein the first reference keypoint is matched to the first keypoint of the first set of matched keypoints;

identify, from the reference image, a first reference keypoint from the second set of matched keypoints based on the first reference keypoint matching the first keypoint of the first set of matched keypoints;

compare a geometry of the feature graph to a geometry of the reference feature graph; and determine relocalization data for the query image based on the comparison.

10. The non-transitory computer-readable medium of claim 9, wherein the computer-readable code to determine the set of initial matches further comprises computer-readable code to remove keypoints from the first set of keypoints that are not matched with the set of reference keypoints.

11. The non-transitory computer-readable medium of claim 9, further comprising computer-readable code to filter the set of initial matches by applying threshold constraint between a nearest neighbor distance and a next nearest neighbor distance among the set of initial matches.

12. The non-transitory computer-readable medium of claim 9, wherein the computer-readable code to obtain the first set of keypoints comprises computer-readable code to:

obtain, for each of the first set of keypoints, a first feature vector, wherein the set of initial matches is determined by comparing the first feature vector to one or more feature vectors for the set of reference keypoints.

13. The non-transitory computer-readable medium of claim 9, wherein the feature graph comprises a spatial representation of a plurality of the first set of keypoints in at least a portion of the query image, and wherein the reference feature graph comprises a spatial representation of keypoints for a corresponding feature vector.

14. The non-transitory computer-readable medium of claim 9, wherein the first set of keypoints are obtained from a first portion of the query image, and wherein the set of initial matches are determined from corresponding portions of the reference image.

15. A system for relocalization, comprising:

one or more processors; and one or more computer-readable medium comprising computer-readable code executable by the one or more processors to:

obtain, for a query image, a first set of keypoints;

determine a set of initial matches between the first set of keypoints and a set of reference keypoints in a reference image to obtain a first set of matched keypoints from the first set of keypoints and a second set of matched keypoints from the set of reference keypoints;

construct a feature graph comprising a geometric spatial relationship between a first keypoint of the first set of matched keypoints and a second one or more keypoints of the first set of matched keypoints, wherein the second one or more keypoints correspond to spatial neighbors to the first keypoint;

identify, from the reference image, a first reference keypoint from the second set of matched keypoints, wherein the first reference keypoint is matched to the first keypoint of the first set of matched keypoints;

identify, from the reference image, a first reference keypoint from the second set of matched keypoints based on the first reference keypoint matching the first keypoint of the first set of matched keypoints;

compare a geometry of the feature graph to a geometry of the reference feature graph; and determine relocalization data for the query image based on the comparison.

16. The system of claim 15, wherein the computer-readable code to determine the set of initial matches further comprises computer-readable code to remove keypoints from the first set of keypoints that are not matched with the set of reference keypoints.

17. The system of claim 15, further comprising computer-readable code to filter the set of initial matches by applying threshold constraint between a nearest neighbor distance and a next nearest neighbor distance among the set of initial matches.

18. The system of claim 15, wherein the computer-readable code to obtain the first set of keypoints comprises computer-readable code to:

obtain, for each of the first set of keypoints, a first feature vector, wherein the set of initial matches is determined by comparing the first feature vector to one or more feature vectors for the set of reference keypoints.

19. The system of claim 18, wherein the first feature vector is obtained from a neural network trained to generate a first binarized feature vector based on input image data.

20. The system of claim 15, wherein the feature graph comprises a spatial representation of a plurality of the first set of keypoints in at least a portion of the query image.

* * * * *